Patented Aug. 19, 1952

2,607,699

UNITED STATES PATENT OFFICE 2,607,699

INSTANTANEOUS RECORDING PHONOGRAPHIC DISKS

George M. Sutheim, Jamaica, N. Y., assignor to Audio Devices, Inc., New York, N. Y., a corporation of New York No Drawing. Application August 26, 1948, Serial No. 46,355

12 Claims. (Cl. 106—37)

This invention relates to phonographic discs of the instantaneous play-back type and has for its object certain improvements in the method of producing such discs, in the discs themselves as an article of manufacture, in the method of producing the recording lacquer, and in the recording lacquer itself as an article of manufacture.

Phonographic discs of the instantaneous play-back type are formed of a base, such as metal, glass, paper, etc., coated with a recording lacquer. The recording lacquers are made in general of mixtures of cellulose esters or ethers, solvents, plasticizers and dyes. Although various formulae are employed, a typical one is 33.3% of ½ sec. nitrocellulose; 18.0% wetting alcohol; 28.2% ethyl acetate; 10.0% dibutyl phthalate; 10.0% castor oil; and 0.5% dye. The coating is dried, by the extraction of volatile solvent, to produce a smooth and uniform surface on the resulting blank phonographic disc. The relatively soft coating on the blank disc is adapted for the cutting of sound grooves or tracks therein by a suitable sound recording or cutting stylus, after which the discs may be played back instantaneously by the use of a suitable sound reproducing point. One of the main advantages of such recorded discs is in their inherent low surface noise when compared to commercially available recorded phonographic discs of the pressed type.

In humid weather, however, or more specifically during a period of weather in which the temperature rises to 80° F. or higher and the relative humidity to 75% or higher, discs, which are quite low in surface noise under more normal conditions, show a very deleterious increase of the noise level, referred to as "climbing." When sound grooves are cut in the disc in humid weather, they appear normal and shiny at first. As the cutting progresses, the grooves change their appearance, they become dull and gray. This change in appearance, of little importance by itself, is invariably acompanied by an increase in noise level. When played back the discs sound noisy to such an extent that the recordings become practically useless.

Since a similar effect can be obtained by using a defective cutting stylus, it is probable that minute coating particles—far below visibility—adhere to the stylus, which thereupon becomes rough and in turn produces rough and noisy sound grooves. In fact, gentle polishing of the stylus apparently removes the adhering particles, whereupon the cutting proceeds well for a few revolutions; after a short while, however, climbing sets in again.

It is, of course, highly desirable from the view point of the user that blank phonographic discs of the instantaneous play-back type be usable under the most adverse weather conditions without any substantial deterioration in quality, particularly with respect to noise level. That the production of such blank discs is of utmost importance to the manufacturer goes without saying, because otherwise his output is considered faulty, and results in a great deal of customer complaints as well as loss of business.

My investigations have led to the discovery that if a suitable agent is added to and dispersed widely throughout the recording lacquer, before it is applied to the base as a coating, the disadvantages just mentioned are for the most part overcome. The objectionable climbing may be entirely or at least substantially eliminated so that recordings may be made during humid weather without an undue increase in noise level. The special ingredient added to the recording lacquer has a modifying effect on the disc coating, the mechanism of which is not fully understood. The ingredient may be referred to conveniently as a modifying or anti-climbing agent.

As will be seen from the following description, the invention resides in the recording lacquers and the blank phonographic discs, as an article of manufacture.

From the standpoint of the recording lacquer per se for the coating of blank phonographic discs of the instantaneous play-back type, the invention involves a lacquer base having a very finely divided inert pigment widely dispersed therein in amount to inhibit climbing when the lacquer forms a coating on a blank phonographic disc and a sound groove is cut in the coating with a sound recording or cutting stylus.

As far as the phonographic disc per se of the instantaneous play-back type is concerned, the invention comprises a base coated with a recording lacquer containing very finely divided inert pigment widely dispersed therein, the pigment being present in amount to inhibit climbing when a sound groove is cut in the coating with a sound recording or cutting stylus.

As already noted, it is customary in this art to employ as a recording lacquer a mixture of cellulose esters or ethers, solvents, plasticizers, and dyes. Each ingredient functions in its intended manner. The cellulosic compounds in large part form the body of the lacquer. The solvents render them soluble for the coating operation. The plasticizers contribute to the pliability of the coatings when the solvents have been extracted in the drying and curing operations. The dyes contribute the desired color. While a variety of dyes may be employed, the one most extensively used is a soluble dye to impart a dark color to the lacquer and hence to the coating on the phonographic disc. Relatively small amounts of the dye are required. The cellulosic esters or ethers, solvents and plasticizers vary somewhat in relative amounts, depending to a large extent on the viscosity desired to facilitate coating of the discs. Various methods are employed to apply the coating to the base, such as dipping, spraying and spreading.

The pigment employed as the modifying or anti-climbing agent is inert or substantially inert to the ingredients going into the recording lacquer, to prevent or inhibit one or more chemical reactions that would impair the quality of the blank phonographic discs for recording. The field of pigments is, of course, large and some of them have marked reactive characteristics, which render them unfit for use in the practice of the invention. There are neutral pigments, however, that are adapted for the practice of the invention and are for that reason included herein. Among such pigments are calcium carbonate, colloidal silica, lithol red, carbon black, phthalocyanine-blue, and precipitated yellow iron oxide. These pigments are mentioned only by way of example, and for that reason they do not, nor are they intended to, exhaust the list of pigments available for the purpose of preventing or inhibiting climbing. The pigments contemplated include finely divided inert particles of any material capable of inhibiting climbing, whether or not they impart opacity to the recording lacquer.

Since sound grooves or tracks are to be cut in the coatings of the blank phonographic discs, the particle size of the pigment should not be sufficiently large of and by itself substantially to raise the noise level. My investigations also clearly indicate that the particle size may be too small effectively to prevent or inhibit climbing. The particles used must be very small, that is, in the lower limits of the colloidal range, preferably between about 10 and 50 millimicrons in size. Particles in the upper limits of the colloidal range or larger, as just noted, cannot be used due to their coarseness. It may be pointed out, however, that even discs coated with a recording lacquer containing the coarser particle size pigment, which therefore have an initial high noise level, do not show any substantial climbing when sound grooves are cut therein in humid weather. It is obvious, however, that it is impractical to use a pigment of such coarse or large particle size that it contributes a high noise level on its own account, quite apart from any climbing due to humid weather. Exceedingly small particles, such as those in a state of molecular dispersion, lose their effectiveness. For practical purposes, an optimum particle size appears to be in the vicinity of 10 millimicrons. In view of the present disclosures, one skilled in the art need only make a simple trial and error test to determine whether a given pigment is suitable for the purpose.

In illustration of the invention, the following examples may be referred to. To an ordinary recording lacquer, such as is used in the art, and which is satisfactory in dry weather so far as climbing is concerned, a number of inert pigments were incorporated in very small amounts and finely dispersed. Among the pigments were calcium carbonate, colloidal silica, Lithol red, carbon black, phthalocyanine-blue and precipitated yellow iron oxide. The pigment was, and is preferably, added in the form of a suitable dispersion to the recording lacquer after which the mixture itself was thoroughly mixed. Separate recording lacquers specially prepared in this manner, along with an untreated recording lacquer as a control, after being coated on a base, were dried and cured in the normal routine fashion. The resulting blank phonographic discs were then placed in a humidity chamber with simulated summer conditions and exposed to this atmosphere for specified periods. As will be seen from the table below, sound grooves were cut in each disc during dry weather and also after each disc was exposed to the simulated humid summer weather for 1-week and for 3-weeks. The results are set out in the following table:

| | Dispersion Added of | Particle Size in mμ | Climbing | | | Remarks |
|---|---|---|---|---|---|---|
| | | | Dry Weather | Humid Summer Weather[1] | | |
| | | | | 1-week | 3-weeks | |
| Control | none | | 0 | up 16 | up 25 | Deleterious Climbing. |
| Example 1 | 0.10% Calcium Carbonate | 50 | 0 | 0 | 0 | Full Protection. |
| Example 2 | 0.10% Colloidal Silica | 10–30 | 0 | 0 | 0 | Do. |
| Example 3 | 0.05% Colloidal Silica | 10–30 | 0 | 0 | 0 | Do. |
| Example 4 | 0.25% Lithol Red | ? | 0 | 0 | 0 | Do. |
| Example 5 | 0.10% Lithol Red | ? | 0 | up 3 | up 7 | Partial Protection. |
| Example 6 | 0.10% Carbon Black | 13 | 0 | 0 | 0 | Full Protection. |
| Example 7 | 0.05% Carbon Black | 13 | 0 | up 2 | up 5 | Partial Protection. |
| Example 8 | 0.25% Phthalocyanine Blue | ? | 0 | up 4 | up 7 | Do. |
| Example 9 | 0.10% Yellow Iron Oxide Precipitated. | 100 | 0 | 0 | 0 | Full Protection. |
| Example 10 | 1.00% Methyl Violet Soluble Dye | Molecular Range | 0 | up 16 | up 25 | Deleterious Climbing. |

[1] i. e. 90° F. ±2° and 80% ±5% Relative Humidity.

Referring to the table, it will be noted that the column to the left identifies the examples. The first one is referred to as "Control," meaning an ordinary coating of recording lacquer not containing pigment. Examples 1 to 10 inclusive refer to coatings of recording lacquers containing a pigment, the name of the pigment and the percent by weight employed being set out in the second column headed "Dispersion added of." The third column gives the particle size of the pigment in millimicrons, so far as this data is available. The next three columns relate to "Climbing," the first of the three referring to the observations in "Dry weather" and the remaining two columns to the observations during simulated "Humid summer weather," one of the latter columns being directed to the observations after "1-week" and the other column after "3-weeks." In other words, sound grooves were cut in each disc during dry weather and also after exposure in simulated humid summer weather for 1-week and 3-weeks, respectively. The last column is headed "Remarks" and a notation is made for each example, to point out the effect on climbing.

Going back to the "Control" example at the top of the list, it will be noted that no dispersion of pigment was added, the space for particle size, therefore, is blank. The zero "0" under "Dry weather" indicates that there was no climbing. The legend "up 16" under "1-week" and the legend "up 25" under "3-weeks," indicate the amount of climbing that occurred. These figures refer to a raise in noise level which in recording practice is denoted in db, decibels. The figures 16 and 25, therefore, indicate a substantial rise in noise level and, as is to be expected, the remark for this example is "Deleterious climbing."

Example 1 refers to the use of 0.10% calcium carbonate having a particle size of 50 millimicrons. While, as noted above, such a particle size of and by itself introduces an undesirable noise level, the values set out in the three different columns for climbing, however, indicate that there was no climbing; which is in turn referred to as "Full protection" in the column "Remarks."

Examples 2 and 3 refer to the use of 0.10% and 0.05% respectively, of colloidal silica having a range of 10–30 millimicrons. The zero mark in each of three columns under "Climbing," indicates that due to the presence of the pigment there was no climbing in dry weather or after 1-week and 3-weeks of exposure to humid summer weather; and the following remark "Full protection" in the last column indicates as much. It will be noted that although twice as much of this pigment was used in one example as in the other, the same beneficial results were observed.

Examples 4 and 5 show the use of 0.25% and 0.10% of Lithol red, respectively, of unknown specific particle size, although presumably within the range herein contemplated. In the case of Example 4, with the larger amount of pigment, there was no climbing in dry weather, or under humid summer weather for 1-week and 3-weeks, so that the legend "Full protection" is to be found, as expected, in the last column. In the case of Example 5, however, with substantially less, half as much, pigment, the noise levels are "up 3" for 1-week and "up 7" for 3-weeks of humid summer weather, so that the legend quite properly is "Partial protection." It is evident that the optimum amount to use may be determined readily by simple tests.

Examples 6 and 7 cover the use of carbon black as the modifying or anti-climbing agent, the particle size being 13 millimicrons. As in all of the examples, no climbing was found under dry weather conditions. In example 6, the carbon black amounted to 0.10% and no climbing was observed under the 1-week and the 3-weeks humid summer weather tests, so that "Full protection" is reported. In example 7 only half as much carbon black, namely 0.05%, was used in recording lacquer, and different results were obtained. The noise levels were "up 2" for 1-week and "up 5" for 3-weeks, thus showing "Partial protection." These examples indicate that some discretion should be exercised in determining the amount of carbon black pigment to be used, but show that the optimum amount is easily found.

Example 8 shows the use of 0.25% phthalocyanine-blue of unknown specific particle size. The noise level figures are "up 4" and "up 7" for the two standard humid summer weather tests of 1-week and 3-weeks, respectively; so that "Partial protection" is noted. Used in different amount, this pigment would undoubtedly show a different result.

Example 9 illustrates the use of 0.10% relatively coarse precipitated yellow iron-oxide, with no climbing found in any of the tests and hence the remark "Full protection." The initial noise level, however, was objectionable.

Example 10, on the other hand, illustrates the use of 1.00% methyl violet soluble dye with a particle size within the molecular range. It will be noted that the results are precisely the same as those reported in the "Control" example; namely, "up 16" for 1-week and "up 25" for 3-weeks of humid summer weather.

It will thus be seen that there is considerable latitude in the choice of pigments so far as the elimination of climbing is concerned. Carbon black is the presently preferred pigment because it is readily obtainable in the form of a prepared dispersion which may be easily added to and readily mixed with the recording lacquer. While this pigment may be used with a recording lacquer containing a dye, the dye may be reduced or eliminated because the carbon black used to prevent or inhibit climbing also darkens the lacquer.

Although it is well-known that pigments may be and are frequently added in substantial amounts to ordinary lacquers to give them the desired color, those engaged in the instantaneous play-back phonographic disc industry have been very careful to keep away from such use of pigments in their recording lacquers. They have felt that the incorporation of pigments in their recording lacquers is merely another way of adding to their troubles, because it merely means the incorporation of noise producing solids; and for that reason unusual precautions are taken to eliminate solids that may be present normally in recording lacquers, quite apart from the fact that pigment solids are not added. To this end the recording lacquers are successively pressure-filtered to insure a coating material that will be free of solids and which, therefore, will keep down the noise level of the disc coating. As a part of this intensive program to keep solids out of the recording lacquers, dyes alone are employed to impart the desired colors. They pass through the filters without any trouble and, of course, are not regarded as solids.

My proposal deliberately to incorporate solids in recording lacquers to reduce noise level, when everyone in the industry is deliberately engaged in keeping them out at all costs to reduce noise level, is regarded as sheer heresy. I have found, much to my surprise and that of my colleagues, that a judicious use of solids, in the form of pigments, is possible, and that such solids do not increase, but on the contrary decrease, noise level when recording under humid summer weather conditions.

The presence of the pigment solids per se in the unfiltered recording lacquer is not disadvantageous because their particle size permits ready passage through the filters, while the customary solids found in the recording lacquer are held back. The presence of the pigment solids in the filtered recording lacquer is not disadvantageous because the coating operation is not in any wise impaired.

As has been shown, the presence of the pigment solids in the disc coating is a decided advantage when recording under humid summer weather conditions. A further advantage is that the presence of the pigment particles in the disc coating does not increase the noise level when recording under dry weather conditions. In other words, a disc with the improved coating of the invention may be stored indefinitely and may be used readily under dry or humid weather conditions with no rise in noise level. This is of considerable importance to the industry.

To one skilled in this art, it will be clear that the practice of the invention readily lends itself to numerous modifications.

I claim:

1. A phonographic disc of the instantaneous play-back type comprising a base, a coating of a pressure-filtered lacquer on the base, said lacquer coating containing an inert pigment dispersed therein to inhibit climbing when a sound groove is cut in the coating with a sound recording or cutting stylus, said pigment having a particle size between about 10 and 50 millimicrons, being present in the lacquer coating to the extent of only a fraction of one per cent and being inert to the ingredients of the recording lacquer to prevent chemical reactions that would impair the quality of the blank phonographic disc for recording.

2. A phonographic disc according to claim 1 in which the pigment is carbon black.

3. A phonographic disc according to claim 1 in which the pigment is calcium carbonate.

4. A phonographic disc according to claim 1 in which the pigment is colloidal silica.

5. A phonographic disc according to claim 1 in which the pigment is Lithol red.

6. A phonographic disc according to claim 1 in which the pigment is phthalocyanine-blue.

7. A recording lacquer for coating phonographic discs of the instantaneous play-back type comprising a lacquer base having incorporated therein an inert pigment to inhibit climbing when a sound groove is cut in the coating with a sound recording or cutting stylus, said pigment having a particle size between about 10 and 50 millimicrons, being present in the lacquer base to the extent of only a fraction of one per cent and being inert to the ingredients of the lacquer base to prevent chemical reactions that would impair the quality of the lacquer for recording purposes.

8. A recording lacquer according to claim 7 in which the pigment is carbon black.

9. A recording lacquer according to claim 7 in which the pigment is calcium carbonate.

10. A recording lacquer according to claim 7 in which the pigment is colloidal silica.

11. A recording lacquer according to claim 7 in which the pigment is Lithol red.

12. A recording lacquer according to claim 7 in which the pigment is phthalocyanine-blue.

GEORGE M. SUTHEIM.

REFERENCES CITED

The following references are of record in the file of this patent:

UNITED STATES PATENTS

| Number | Name | Date |
|---|---|---|
| 2,006,378 | Whyte | July 2, 1935 |
| 2,206,636 | Hunter | July 2, 1940 |
| 2,221,270 | Severin | Nov. 12, 1940 |
| 2,327,550 | Lukens | July 6, 1943 |
| 2,359,746 | Cabot | Oct. 10, 1944 |
| 2,457,154 | Hunter | Dec. 28, 1948 |

FOREIGN PATENTS

| Number | Country | Date |
|---|---|---|
| 466,023 | Great Britain | 1937 |